J. M. WEBB.
PINK BOLL WEEVIL DESTROYER.
APPLICATION FILED SEPT. 27, 1920.
1,396,797.
Patented Nov. 15, 1921.
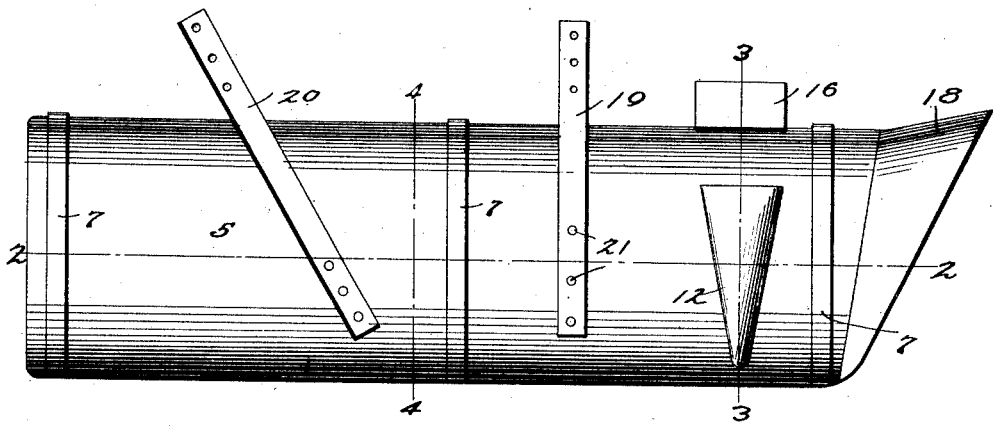
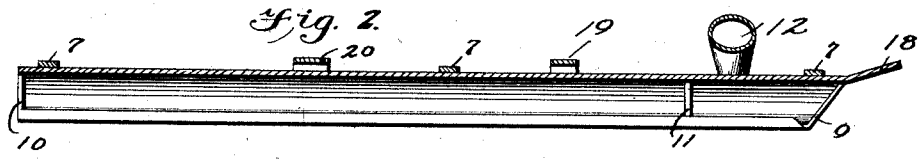
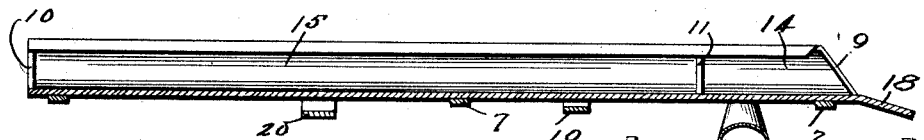
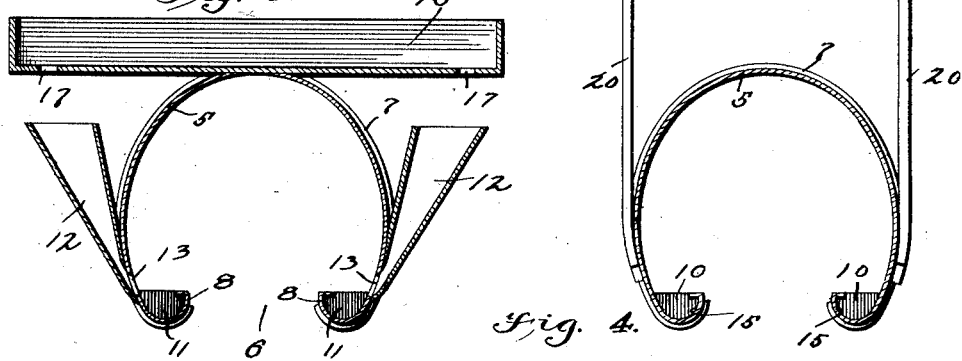
WITNESSES
INVENTOR
J. M. Webb,
BY
ATTORNEYS

UNITED STATES PATENT OFFICE.

JOHN MOLAND WEBB, OF FLAT, TEXAS.

PINK-BOLL-WEEVIL DESTROYER.

1,396,797.  Specification of Letters Patent.  Patented Nov. 15, 1921.

Application filed September 27, 1920. Serial No. 412,943.

*To all whom it may concern:*

Be it known that I, JOHN MOLAND WEBB, a citizen of the United States, and a resident of Flat, in the county of Coryell and State of Texas, have invented certain new and useful Improvements in Pink-Boll-Weevil Destroyers, of which the following is a specification.

This invention relates to an improved pink boll weevil and worm catcher and destroyer, particularly adapted for use in connection with the raising of cotton plants, so as to rid the plants of these injurious pests in a convenient and effective manner, the device being so constructed as to permit it to be readily applied to cultivators through the medium of the beams thereof.

It is among the objects of the invention to provide an improved construction of body, together with supporting means and pans having novel means of supplying the extinguishing matter thereto.

Other and further objects of my invention will become readily apparent to persons skilled in the art from a consideration of the following description when taken in conjunction with the accompanying drawings, in which:—

Figure 1 is a side elevation of my improved boll weevil and worm catcher and destroyer, Fig. 2 is a horizontal sectional view taken on the line 2—2 of Fig. 1, and looking downwardly, Fig. 3 is a vertical sectional view taken on the line 3—3 of Fig. 1, and Fig. 4 is a vertical sectional view taken on the line 4—4 of Fig. 1.

Referring to the drawings in detail, in which like reference characters designate corresponding parts throughout the several views, my improved boll weevil and cotton worm catcher and destroyer is shown as embodying a substantially cylindrical or inverted U-shaped body 5 formed of sheet metal or the like into curved or arched formation and open at the bottom, the forward edges preferably flaring outwardly, in order that the longitudinal edges will effectively enter around the growing plants without bruising the stalks or limbs thereof, in addition to providing the necessary resiliency to permit the device to pass over stumps or other objects which would hinder in plowing. To facilitate the return of the body to normal position, the latter is provided with a plurality of steel bands 7, extending to the open portion 6 above referred to, the latter being secured at spaced points, preferably intermediately and near the ends of the body and serving to bring the body back in position when the same has passed an obstruction.

Along the edges at the opening 6, the body is provided with pans 8 preferably formed by curving or bending the longitudinal edges inwardly and upwardly so that such pans are open at the top and provided with closed front and rear end walls 9 and 10 respectively. Also, near the front ends, are provided vertical partitions 11 dividing the pans at the forward ends for receiving therein, a supply of sulfur through funnels 12 extending in inclined substantially vertical positions at the sides of the body and communicating through openings 13 with the pans forwardly of the partitions 11, the said portions, as distinguished from the rear portions, being designated at 14, while the rear portions are designated at 15, and comprising the burning pans in which the sulfur or the like is ignited so that the fumes thereof may escape against the plants to effectively kill or destroy the cotton weevil and worms. The sulfur is supplied into the funnels from a pan 16 arranged transversely across the top of the body so that the ends are disposed over the funnels, and may be provided with openings 17 through which the sulfur is discharged into the funnels in the proper quantity. The portions of the pans designated 15, are adapted to receive a poisonous fluid in order that the weevils and worms will be killed after dropping off of the plant due to the action of the sulfur fumes thereon.

The body is preferably about six feet long and at the forward end, is provided with a flaring mouth piece 18 to facilitate the entrance of the plants, in conjunction with the rearwardly diverging pans or side edges of the passage or opening at the bottom, and the body is adapted to be supported from the beams of a cultivator plow or the like through the medium of vertically adjustable side braces 19 and 20, which latter are provided with a plurality of openings 21 engaging corresponding fastening means of the beams and body respectively, in order that the body may also be adjusted in proper relation to the ground, preferably from three or four inches above the same. This will also permit the pans or troughs to reach the cotton plant without bruising the stalks or limbs, the said pans or troughs being about four inches wide. Of course, the side branches 19 and 20 will also permit the device to be adjusted to fit the particular type of plow to which the device is attached and as it is advanced along the ground over the rows of growing plants, the gas or fumes from the sulfur burning in the pans 14, will kill the weevils and worms, and cause the same to drop into the pan 15, so as to effectively destroy, catch and kill the same.

In view of the foregoing, it is thought that the operation of the device will be readily understood and in view of the simplicity and practical value that it will commend itself to those skilled in the art.

I claim:

1. A boll weevil and worm catcher and destroyer, comprising a substantially cylindrical body having spaced bottom portions forming a clearance space therethrough, pans located at the bottom edges of the body, said body being substantially circular in cross section and having the pans at the bottom provided with closed ends and projecting inwardly, partitions in said pans, funnels leading from the outside of said body to said pans forwardly of said partitions, and means for supplying sulfur to said funnels to be burnt in said pans last named.

2. The combination with a body of resilient sheet material; of pans mounted on said body, said body having spaced bottom edges bent inwardly and upwardly to form troughs, the forward end of the body being provided with a flaring portion, said troughs being closed at their front and rear ends and provided with partitions adjacent to the forward ends thereof, a pan supported transversely upon the body, funnels leading through the sides of said body into the forward portions of the troughs and receiving a supply of sulfur from said pan, to be burnt in said forward portions of the troughs, the rear portions being adapted to receive a poisonous fluid, and means for suspending said body at a spaced distance from the ground for advancement along a row of cotton plants or the like.

3. A boll weevil and worm catcher and destroyer comprising a substantially inverted U-shaped body having spaced side portions and bottom edges forming a clearance space therebetween, pans located at the bottom edges of the body, receiving members mounted at the sides of the body and discharging into the pan, and a container mounted on the body and provided to discharge the contents thereof into said receiving means as desired.

JOHN MOLAND WEBB.